May 3, 1949.  W. M. CAMPBELL  2,468,864

SEWAGE TREATMENT AND OIL AND WATER SEPARATION

Filed Dec. 29, 1945  2 Sheets-Sheet 1

INVENTOR
Warren M. Campbell,
BY Ezekiel Wolf
ATTORNEY

May 3, 1949.   W. M. CAMPBELL   2,468,864
SEWAGE TREATMENT AND OIL AND WATER SEPARATION
Filed Dec. 29, 1945   2 Sheets-Sheet 2

INVENTOR
Warren M. Campbell,
BY
ATTORNEY

Patented May 3, 1949

2,468,864

UNITED STATES PATENT OFFICE 2,468,864

SEWAGE TREATMENT AND OIL AND WATER SEPARATION

Warren M. Campbell, Winthrop, Mass.

Application December 29, 1945, Serial No. 638,271

7 Claims. (Cl. 210—5)

The present invention relates to water and sewage treatment and also to oil and water separation. The system according to the present invention may serve in the initial treatment of sewage and in the treatment for purification from which solid matter has been removed.

At the present time many large cities dispose of their raw sewage into rivers from which drinking water is drawn at a distance not sufficiently far away so that it can be certain that the water is not polluted or contaminated. In order to insure safe drinking water in such places, the water must be further filtered and usually heavily doctored with purifying chemicals, such as chlorine and other similar chemicals. These methods of purifying the water are however not wholly satisfactory and further give the water an undesirable taste. Further disposal of raw sewage in rivers pollute the water for such a great distance from the source of disposal that bathing and other water sports must be abandoned over a large area, in addition to the fact that fish life is practically completely destroyed.

The desirability of sanitary sewage disposal is gradually being recognized and proper methods and means for such purposes are not only economically sound, but also may be made economically profitable since sewage disposal after proper purification provides by-products which may be usefully employed.

The disposal of raw sewage into rivers and lakes has been the cause of pollution of the water to such an extent that corrective measures are now imperative for health and comfort. Raw sewage has been disposed in rivers and lakes because for the most part perhaps 90% is water. Treatment of this water with separation of the sludge will again purify the water so that it may safely be permitted to flow off into rivers and lakes without contaminating them, while the sludge might otherwise be disposed of after treatment if desired for useful purposes.

This is accomplished in the present system as well as oil and water separation which may also be used for other purposes.

The present method also offers a practical means of sewage purification so that disposal of the sewage may be accomplished without pollution or contamination in any way.

The present invention will be more fully described in connection with the description in the specification below when taken in connection with the drawings, in which—

Figure 1:
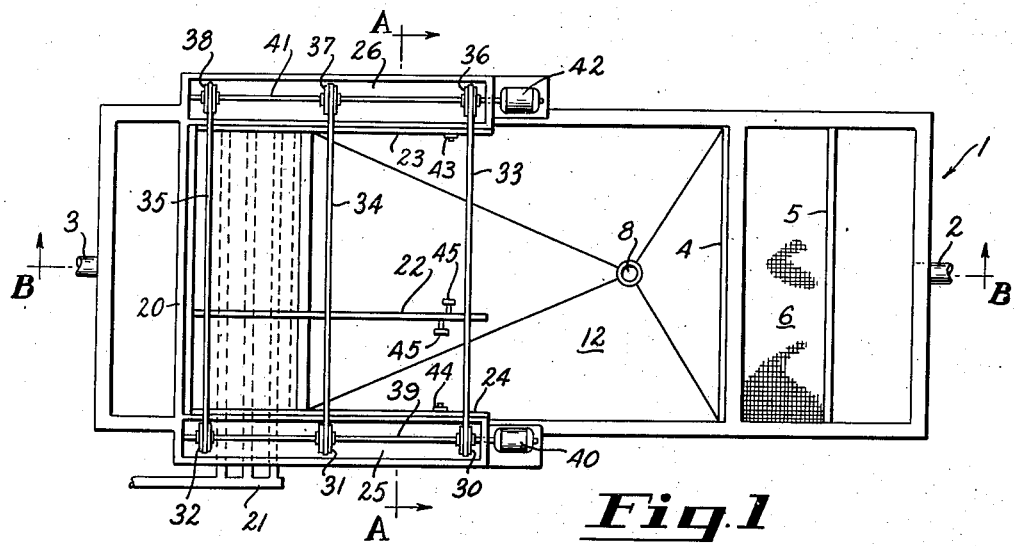
Figure 1 shows a plan view of a water treatment tank according to the present invention.
Figure 3:
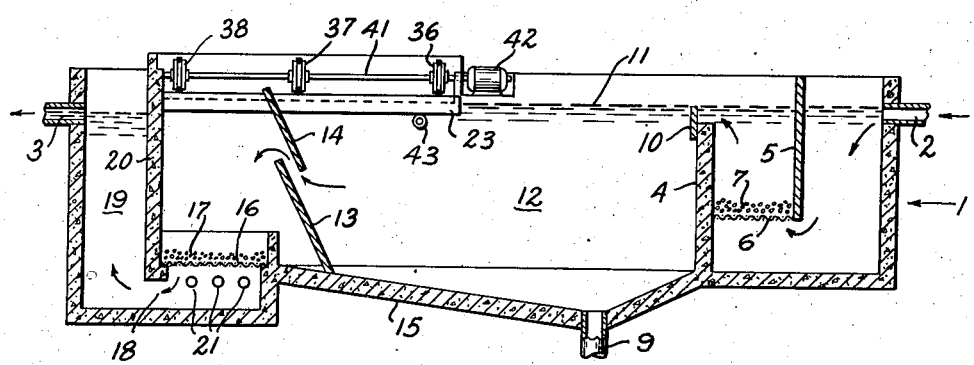
Figure 3 shows a section taken substantially on the line B—B of Figure 1.
Figure 2:
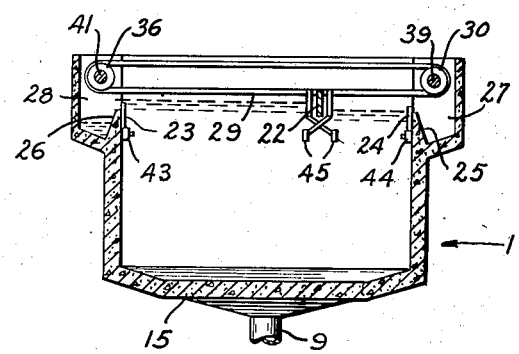
Figure 2 shows a section taken on the line A—A of Figure 1.

In the arrangement of Figures 1, 2 and 3 there is shown an elongated tank 1, which may be of concrete, metal or other composition which will stand up for the purpose for which the tank is used. At the right end there is indicated an inlet flow pipe 2 and at the other end an outlet flow pipe 3, through which a continuous flow of water to be purified may be maintained. Initially at the inlet opening to the right of the tank there is provided a wall 4 extending transversely across the tank. This wall extends upwards to the vicinity of the level of the inlet pipe but slightly below the level of water in the tank. Between this wall and the right tank wall there is a second partition 5 extending across the tank from the top of the tank downward to the vicinity of the bottom. A screen basket 6 is provided in the space between the walls 4 and 5, or if desired a screen may be placed across the space between the walls 4 and 5. The space between the walls 4 and 5 where the screen or screen basket is contained is filled to the level of the wall 4 with a filtering bed 7 which may be of crushed stone, quartz sand, Raschig rings, or some other similar material.

The center portion of the tank to the left of the wall 4 is preferably formed with a low point somewhere near the wall 4, for instance at 8, where an outlet is provided and the outlet pipe 9 for removal of the heavy material which might gradually settle at the bottom of the tank.

The water flows over the adjustable weir 10 at the top of the wall 4 in a comparatively even slow flow in such a manner as to permit the separation of the oil from the water the oil surface lying on top of the water surface as indicated by the small liquid section 11.

To the left of the central portion 12 of the elongated tank are a pair of baffle plates 13 and 14, the baffle plate 13 having one edge extending to the bottom wall nearer the top water surface of the tank. The second baffle 14 extends in an arc upward from a point below the top of the baffle 13 to the vicinity of the water surface. To the left of the baffle 14 an outlet 16 is provided for the central portion of the tank through the removable filter bed 17 into the outlet flow compartment 18 to the section 19 of the tank which is partitioned off from the rest of the tank by the wall 20 extending upward to the top of the tank from somewhere near the bottom sufficient to allow the flow of water out of the base of the filter bed 17. The filter bed 17 may be a basket containing similar filter materials as that described for the member 7 at the other side of the tank. In addition the filter bed at its bottom may be provided with a group of aeration pipes 21 through which air or oxygen may be blown up through the water which flows down through the filter bed. The outlet pipe 3 may stand at a slightly lower level than the inlet pipe 2. The flow of water through the tank may be traced by the series of short arrows commencing with the arrow $a$ at the right inlet of the tank. The water flows downward as indicated by the arrow between the partition 5 and the end wall upward through the filter bed over the weir 10 into the central portion of the tank between the baffles 13 and 14 and upward on the outer side of the baffle 14 from which position it flows downward through the filter bed 17 and upwards on the left end of the tank between the end wall and the partition 20 outward through the inlet pipe 3.

The separation of the oil and water is accomplished by means of a surface scraper 22 which reciprocates back and forth transversely across the tank and pushes the surface oil over the adjustable weirs 23 and 24 one each on either side of the tank where the oil scraper works. This is shown more in detail in Figure 2. The oil flows over the side wall of the tank at 25 and 26 and into suitable collecting troughs 27 and 28. This oil scraper may be supported by a belt 29 which in turn is driven by sprocket chains 33, 34 and 35, and gears 30, 31 and 32 at one side of the tank and 36, 37 and 38 at the other side of the tank, the gears 30, 31 and 32 being driven by the shaft 39 which is turned by the motor 40, and the gears 36, 37 and 38 being driven by the shaft 41 which is turned by the motor 42.

Figure 5:
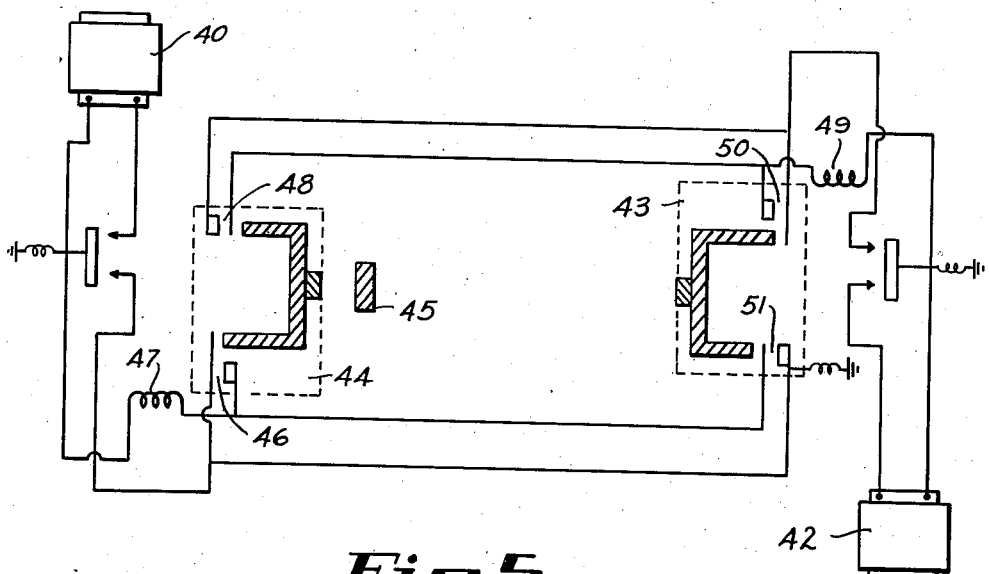

The motors 40 and 42 work alternately, one carrying the scraper in one direction transversely across the surface of the tank, and the other returning the scraper back to its initial position. For this purpose limit and reversing switches are provided as indicated in Figure 5 for deenergizing one motor when the scraper comes to one end of the tank and energizing the other motor to return it to the opposite end of the tank. This is shown diagrammatically in Figure 5, in which the limit switches 43 and 44 are operated by a bar 45 projecting at one end of the scraper 22. When this bar 45 hits the limit switch 44, the contacts 46 are forcibly opened and the circuit to the motor 40 is broken by the demagnetization of the relay 47. At the same time the contacts 48 are momentarily closed which energizes the relay coil 49 closing both pairs of contacts 50 for starting the operation of the motor 42. The contacts 48 open again as the bar 45 leaves the limit switch 44, but since a circuit is complete through the contacts 50, the motor 42 will continue to run until the contacts 50 are forcibly opened when the bar 45 comes in contact with the limit switch 43. The cycle is again repeated by the closing of the contacts 51 which starts in operation the reenergization of the motor 40.

Figure 4:
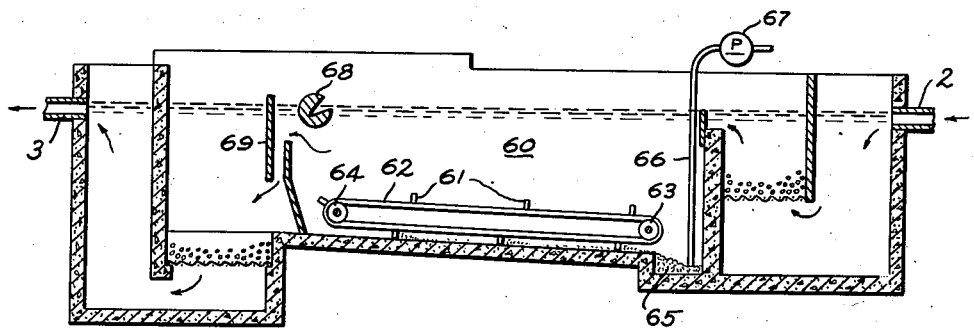
Figure 4 shows a modified section of the device of Figure 1 on comparatively the same section line as taken in Figure 1, and, Figure 5 shows a circuit diagram of the electrical apparatus which may be used in connection with the operation of the system.

In Figure 4 a slight modification is shown of the arrangement of Figure 3. In this case the inlet is the same as described in connection with Figure 3. In the central chamber 60 of the tank of Figure 4, an elongated bottom slope is provided over which a scraper 61 is driven by a belt 62 operating over the pulleys 63 and 64, one of which may be driven by a motor. A well 65 is provided at the lower end of the slope into which the sludge falls. This sludge is pumped out through the line 66 by the sludge pump 67. The natural tendency in Figure 4 is for the flow to move from the right to the left. The oil surface on top of the water is removed by the V-shaped trough 68 extending transversely across the tank near the positions of the top baffle 69 corresponding to the baffle 14.

In the operation of the system in accordance with the present invention, the water entering at the right should flow at such a rate across the tank that in the central part of the tank beyond the weir 10, the oil droplets will have a chance to come to the top surface of the water by the time they have progressed to the position of the scraper and the solid particles will have a change to settle to the bottom of the tank. For a more rapid flow, the tank must be proportionately longer.

The "Raschig" rings in the filter act to separate the oil from the solid particles, thus making the oil lighter so that it more readily rises to the top of the water. The scraper in Figure 3 may be slotted to accommodate the projection of the baffle 14 and scrape the oil on both sides of the baffle. Besides this however, since the water is forced downwards through the filter bed 17, the lighter oil particles if any are present, will tend to be forced to the surface in this action as the water is forced against the upward flow of air or oxygen. The air flow from the pipe 21 will also tend to carry the oil particles up to the surface as well also as the material of the filter bed.

The separation of the solid particles and water before water purification and carrying off the settled material from a low level of the tank will prevent any recontamination of the purified water.

When used for sewage treatment alone, the first filter at the right may be eliminated and the solid matter may be permitted to settle at the bottom of the central section of the long tank and gathered at the sludge pump inlet. Purification of the water is obtained in this case by forcing the water, after it has passed through the baffle, following separation of oil and solid matter, downward through the filter bed against an upward flow of oxygen. Since this purification takes place at the end of the system there is no chance of contamination.

Having now described my invention, I claim:

1. A system for water and sewage treatment and oil separation, comprising an elongated tank having an inlet pipe at one end and an outlet pipe at the other end, a set of spaced baffle walls at the inlet end, the first extending downward from the top of the tank and the second upwards from the bottom of the tank, a filter bed extending across the space between said baffle walls whereby the flow is upwards through the filter bed and over the second baffle wall, a second set of spaced baffle walls in the path of flow to the outlet pipe near the outlet end of the tank, the first of said second set of baffle walls extending from the bottom of the tank upwards across the path of flow and the other of said second set extending from the top of said tank downward therein, a second filter bed extending across the space between said second set of baffle walls whereby the flow is downward through said second filter bed, the liquid flow from the first to the second set of baffle walls being slow and the space comparatively long permitting the oil gradually to rise to the surface in the region of the second set of baffle walls, means for removing the oil from the water in said region and means for draining the sludge from the bottom of the tank.

2. A system for water and sewage treatment and oil separation, comprising an elongated tank having an inlet pipe at one end and an outlet pipe at the other end, a set of spaced baffle walls at the inlet end, the first extending downward from the top of the tank and the second upwards from the bottom of the tank, an adjustable weir extending across said second baffle wall at the top for establishing the liquid level in the tank up to the first set of baffle walls, a filter bed extending across the space between said baffle walls whereby the flow is upwards through the filter bed and over the second baffle wall, a second set of spaced baffle walls in the path of flow to the outlet pipe near the outlet end of the tank, the first of said second set of baffle walls extending from the bottom of the tank upwards across the path of flow and the other of said second set extending from the top of said tank downward therein, a second filter bed extending across the space between said second set of baffle walls whereby the flow is downward through said second filter bed, the liquid flow from the first to the second set of baffle walls being slow and the space comparatively long permitting the oil gradually to rise to the surface in the region of the second set of baffle walls, and means for removing the oil from the water in said region and means for draining the sludge from the bottom of the tank.

3. A system for water and sewage treatment and oil separation, comprising an elongated tank having an inlet pipe at one end and an outlet pipe at the other end, a set of spaced baffle walls at the inlet end, the first extending downward from the top of the tank and the second upwards from the bottom of the tank, a filter bed extending across the space between said baffle walls whereby the flow is upwards through the filter bed and over the second baffle wall, a second set of spaced baffle walls in the path of flow to the outlet pipe near the outlet end of the tank, the first of said second set of baffle walls extending from the bottom of the tank upwards across the path of flow and the other of said second set extending from the top of said tank downward therein, a second filter bed extending across the space between said second set of baffle walls whereby the flow is downward through said second filter bed, a plurality of pipes at the bottom of said filter bed having openings through which oxygen containing gas is adapted to be forced in a direction opposite to the liquid flow, the liquid flow from the first to the second set of baffle walls being slow and the space comparatively long permitting the oil gradually to rise to the surface in the region of the second set of baffle walls, means for removing the oil from the water in said region and means for draining the sludge from the bottom of the tank.

4. A system for water and sewage treatment and oil separation, comprising an elongated tank having an inlet pipe at one end and an outlet pipe at the other end, a set of spaced baffle walls at the inlet end, the first extending downward from the top of the tank and the second upwards from the bottom of the tank, a filter bed extending across the space between said baffle walls whereby the flow is upwards through the filter bed and over the second baffle wall, a second set of spaced baffle walls in the path of flow to the outlet pipe near the outlet end of the tank, the first of said second set of baffle walls extending from the bottom of the tank upwards across the path of flow and the other of said second set extending from the top of said tank downward therein, a second filter bed extending across the space between said second set of baffle walls whereby the flow is downward through said second filter bed, the liquid flow from the first to the second set of baffle walls being slow and the space comparatively long permitting the oil gradually to rise to the surface in the region of the second set of baffle walls, means for removing the oil from the water in said region, said means comprising a scraper positioned longitudinally of said tank extending into the top section of the tank where the oil layer has formed on the top of the water, a belt supporting said scraper for movement across said tank, motor power means for moving said scraper across said tank, and adjustable weirs at the sides of said tank parallelly positioned with respect to said scraper over which said oil adapted to accumulate is made to flow.

5. A system for water and sewage treatment and oil separation, comprising an elongated tank having an inlet pipe at one end and an outlet pipe at the other end, a set of spaced baffle walls at the inlet end, the first extending downward from the top of the tank and the second upwards from the bottom of the tank, a filter bed extending across the space between said baffle walls whereby the flow is upwards through the filter bed and over the second baffle wall, a second set of spaced baffle walls in the path of flow to the outlet pipe near the outlet end of the tank, the first of said second set of baffle walls extending from the bottom of the tank upwards across the path of flow and the other of said second set extending from the top of said tank downward therein, a second filter bed extending across the space between said second set of baffle walls whereby the flow is downward through said second filter bed, the liquid flow from the first to the second set of baffle walls being slow and the space comparatively long permitting the oil gradually to rise to the surface in the region of the second set of baffle walls, means for removing the oil from the water in said region, said means comprising a scraper positioned longitudinally of said tank extending into the top section of the tank where the oil layer has formed on the top of the water, a belt supporting said scraper for movement across said tank, a motor power means for moving said scraper back and forth across said tank including limit switches for reversing the direction of movement of said scraper when it has reached the side of said tank, and adjustable weirs at the sides of said tank parallelly positioned with respect to said scraper over which said oil adapted to accumulate is made to flow.

6. A system for water and sewage treatment and oil separation comprising an elongated tank having an inlet pipe at one end in the upper part of the tank and an outlet pipe at the other end at the same level as the inlet pipe, a set of spaced baffle walls at the inlet end, the first extending downward from the top of the tank and the second upwards from the bottom of the tank, a removable coarse filter bed having a level not higher than the top of said second baffle wall extending across the space between said baffle walls, the top of said second baffle wall being approximately at the level of said inlet pipe, a second set of spaced baffle walls in the path of flow to the outlet pipe near the outlet end of the tank, the first of said second set of baffle walls extending from the bottom of the tank upwards across the path of flow of the liquid and the other of said second set extending from the top of said tank downward therein, a second removable filter bed extending across the space between said second set of baffle walls, the level of said bed being below the top of the last upwardly extending baffle wall, the liquid flow from the first to the second set of baffle walls being slow and the space comparatively long, permitting the oil gradually to rise to the surface in the region of the second set of baffle walls and means for removing the oil from the water in said region.

7. A system for water and sewage treatment and oil separation comprising an elongated tank having an inlet pipe at one end in the upper part of the tank and an outlet pipe at the other end at the same level as the inlet pipe, a set of spaced baffle walls at the inlet end, the first extending downward from the top of the tank and the second upwards from the bottom of the tank, a removable coarse filter bed having a level not higher than the top of said second baffle wall extending across the space between said baffle walls, the top of said second baffle wall being approximately at the level of said inlet pipe, a pair of spaced partitioning walls extending across said tank in the vicinity of the outlet pipe, the one nearest the outlet pipe extending from the top of the tank downward and the other from the bottom of the tank upwards, a removable filter bed having a level no higher than the last mentioned wall, and a pair of baffle plates extending across said tank before the position of said last filter bed with reference to the direction of flow, one extending above the water level and the other to the bottom of the tank but spaced from each other to permit the liquid to flow under first and then over the second mentioned plates.

WARREN M. CAMPBELL.

REFERENCES CITED

The following references are of record in the file of this patent:

UNITED STATES PATENTS

| Number | Name | Date |
| --- | --- | --- |
| 652,155 | Wingrove | June 19, 1900 |
| 748,981 | Oliver | Jan. 5, 1904 |
| 777,159 | Tunbridge | Dec. 13, 1904 |
| 805,880 | Rider | Nov. 28, 1905 |
| 819,664 | Lowe | May 1, 1906 |
| 976,923 | Rothwell | Nov. 29, 1910 |
| 1,095,409 | Mann et al. | May 5, 1914 |
| 1,166,802 | Albert et al. | Jan. 4, 1916 |
| 1,307,686 | Linden | June 24, 1919 |
| 1,700,791 | Elrod | Feb. 5, 1929 |
| 1,703,041 | Imhoff | Feb. 19, 1929 |
| 1,743,524 | Cabrera | Jan. 14, 1930 |
| 1,804,743 | Cannon | May 12, 1931 |
| 2,159,409 | Tark | May 23, 1939 |

FOREIGN PATENTS

| Number | Country | Date |
| --- | --- | --- |
| 450,422 | Great Britain | July 17, 1936 |
| 376,076 | France | Mar. 23, 1907 |
| 629,859 | France | Feb. 25, 1927 |